United States Patent [19]
Smith et al.

[11] Patent Number: 6,066,814
[45] Date of Patent: May 23, 2000

[54] INTERLOCK FOR SWITCHGEAR

[75] Inventors: James E. Smith, Bethel Park; Daniel J. Glus, North Braddock; David A. Riffe, Clinton, all of Pa.

[73] Assignee: Eaton Corporation, Cleveland, Ohio

[21] Appl. No.: 09/252,412

[22] Filed: Feb. 18, 1999

[51] Int. Cl.[7] .............................. H01H 9/20; H02B 5/00; H02B 11/00
[52] U.S. Cl. .................................. 200/50.24; 200/50.22; 361/609
[58] Field of Search ........................ 200/50.21–50.32; 361/604–625; 335/185–195

[56] References Cited

U.S. PATENT DOCUMENTS

| | | | |
|---|---|---|---|
| 3,921,109 | 11/1975 | Hodgson | 335/195 |
| 5,164,883 | 11/1992 | Little et al. | 362/609 |
| 5,200,585 | 4/1993 | Davies et al. | 200/50.22 |
| 5,434,369 | 7/1995 | Tempco et al. | 200/50.26 |
| 5,477,017 | 12/1995 | Swindler et al. | 200/50.24 |
| 5,581,133 | 12/1996 | Smith | 307/64 |
| 5,661,627 | 8/1997 | Liebetruth et al. | 361/115 |

OTHER PUBLICATIONS

Cutler–Hammer Literature, "Westinghouse 5/15 kV Medium Voltage Switchgear Copmonents", May 1996.

*Primary Examiner*—J. R. Scott
*Attorney, Agent, or Firm*—Martin J. Moran

[57] ABSTRACT

Electrical switchgear for receiving either a vacuum circuit breaker or a dummy element and including a levering-in assembly with a positional interlock bar that is operated by a levering-in block in the levering-in assembly and by a finger on the dummy element. Access to the levering-in device is blocked when the source breaker is in the connect position. A key to unlock the access is obtained by levering the source breaker or a dummy out to the test position and locking it in that position or by levering a dummy element to a connect position and locking it in that position.

10 Claims, 10 Drawing Sheets

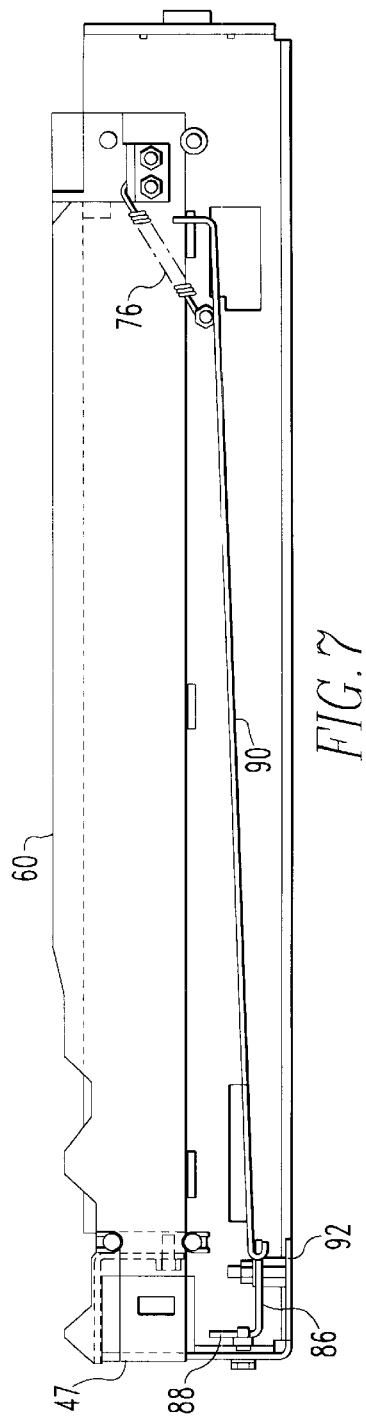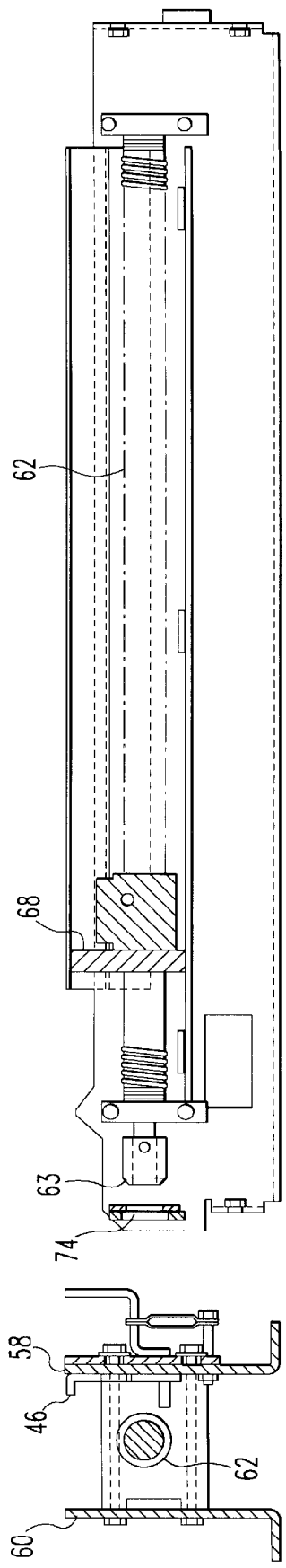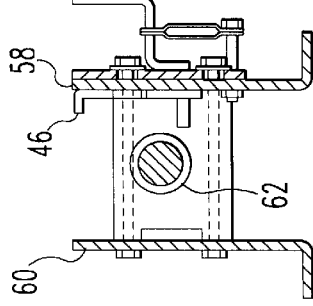

INTERLOCK FOR SWITCHGEAR

BACKGROUND OF THE INVENTION

1. Field of the Invention

This invention relates to electrical switchgear and particularly to switchgear adapted to have a dummy element mounted in it in place of a circuit breaker.

2. Background Information

Circuit breakers for medium voltage switchgear apparatus applications are generally housed in metal enclosures and are removable. The apparatus typically includes at least one levering-in mechanism or device to move a circuit breaker between a disconnect position, in which the primary contacts of the circuit breaker are fully disengaged from the mating primary contacts within the enclosure, and a connect position, in which the primary contacts of the circuit breaker and enclosure are fully engaged. Levering-in and levering-out/withdrawing of a circuit breaker is typically accomplished by using a detachable hand crank which is inserted into the levering-in mechanism to move the circuit breaker within the cell as a function of turning the crank.

Typically, power is provided to auxiliary devices and control circuitry through mating secondary contacts mounted with the circuit breaker in the enclosure. At some point during movement of the circuit breaker from the disconnect to the connect position, the respective secondary contacts must be engaged so the power is provided to the auxiliary devices and control electronics. When the secondary contacts are engaged, but the primary contacts are disengaged or disconnected, the auxiliary functions of the circuit breaker can be safely tested since the breaker is dead.

Dummy elements are used as a means of isolating circuits or bus sections in switchgear where operation is infrequent and a circuit breaker cannot be economically justified. The device consists of a circuit breaker mechanism frame and primary insulator supports with primary studs including disconnecting devices. Copper rods are secured in the location normally occupied by vacuum interrupters. The stationary structure is the same as for a circuit breaker. When the device is fully levered in, it connects the breaker primary disconnects to the enclosure primary contacts. The dummy element is not a switching device and therefore it requires a special interlocking system for safe operation. An interlock system is required that insures that the dummy element cannot be levered from the test position or the disconnect position to the connect position or vice versa, unless all sources to it are disconnected and locked in that position.

In a typical system, a dummy element is connected to an upstream or upline of a circuit breaker so power for the dummy circuit comes from or through the upstream circuit breaker. Both breaker compartments (breaker and dummy) contain positional interlocks and key interlocks that operate with the same key. The key is required to move the dummy element between the test and connect positions. The key can be removed from the upstream breaker circuit only when the breaker is locked in a de-energized (test/disconnect/withdrawn) position.

A typical interlocking system consists of an operator on the dummy element and a dummy/breaker position interlock in the dummy element's compartment as well as in all source breaker compartments connecting to the dummy element. In order to lever the dummy element, access to the compartment levering device is required. This access is blocked when the source circuit breaker(s) is in the connect position, regardless of whether the dummy element is in the test/disconnected position or the connected position. As stated above, the key to unlock the access can be obtained only by levering the source breaker(s) out to the test position and locking it (them) in that position. This assures that the dummy element can be levered in or out only in safe mode; i.e., when the source breaker(s) is locked in a test/disconnect or withdrawn position. The source breakers do not have the operator, so they are lockable only in the test position.

In case there is more than one source, the key for the dummy element interlock will usually be obtained from a transfer lock at which all the source keys are accumulated and captured before the dummy element key can be obtained. When applying the dummy element in the system, the position interlocks must be used in the dummy compartment as well as in all source breaker compartments.

The cell positional interlock for a breaker/dummy element is a very critical safety feature that prevents anyone from levering a dummy element, on or off, the bus stabs without the load being removed. If the dummy element is levered on or off the bus stabs with the load connected, severe arcing of the primary stabs and/or potential explosion could result. The interlock permits the dummy element to be key interlocked, such that the dummy element cannot be moved from the disconnected to connected or connected to disconnected/test positions without the source breaker or switch being opened, withdrawn to the disconnected position and key locked in that position.

There is a need for an improved interlock for switchgear containing a dummy element which cannot be easily defeated.

There is a need for such an improved interlock that can be retrofitted into existing switchgear.

SUMMARY OF THE INVENTION

These above and other needs are satisfied by the present invention which is directed to provision of a positional interlock bar that prevents a dummy element from being leveraged into or out of the connect position when the breaker(s) is in the connect position. The interlock bar is located inside the levering-in assembly and cannot be easily accessed to defeat the interlock. It has a slot in one end that is the same size of slot as is on the slider assembly. The slot in the slider assembly lines up with the slot in the interlock bar for insertion of the padlock slider only when no breaker is in the cell or when the breaker or dummy element is in the test/disconnect position. When the padlock slider is in this locked position, the key in the key lock can be turned and removed to be used to operate the padlock for another switchgear in the same line. The positional interlock bar also has a finger on it that is engageable by an operator on the dummy element to move the interlock bar rearward during movement of the dummy element to the connect position. This moves the interlock bar far enough past the slot in the levering assembly slider (in normal position), that the key lock can be operated and the key removed to allow source breaker to be operated.

The positional interlock bar is spring loaded, such that as the breaker or dummy element is levered from the connected to the test/disconnected position, the bar will return to the initial position, with the slots in both the levering assembly slider and the interlock bar lining up. The positional interlock bar also has a pin in it that is engaged and moved by a levering-in block, when a circuit breaker is levered-in to a connect position, to a position of the bar in which the slot in the bar is not lined up with the slot in the slider assembly. The levering-in assembly cannot be locked when the interlock bar is in that position. The circuit breaker is located over the levering assembly, when the source breaker is in the connect position, so that the positional interlock cannot be accessed from the front so as to defeat the interlock.

The object of this invention is to provide a failsafe interlock for electrical switchgear that includes a dummy element.

BRIEF DESCRIPTION OF THE DRAWINGS

A full understanding of the invention can be gained from the following description of a preferred embodiment of the invention when read in conjunction with the accompanying drawings in which:

FIG. 7 is a side elevational view of the levering-in assembly from the levering-in pan assembly of FIG. 6.

FIG. 8 is a vertical cross-sectional view through the levering-in assembly of FIG. 6 taken on line 8—8 of that Figure.

FIG. 9 is a cross-sectional view of the levering-in assembly of FIG. 6 taken on line 9—9 of that Figure.

DESCRIPTION OF THE PREFERRED EMBODIMENTS

This invention is used when an electrical distribution system includes multiple switchgear assemblies, at least one of which may include a dummy element instead of a vacuum interrupter. A dummy element is less expensive than a vacuum interrupter and is used when operation is infrequent and the cost of a vacuum interrupter is not justified.

Figure 1:
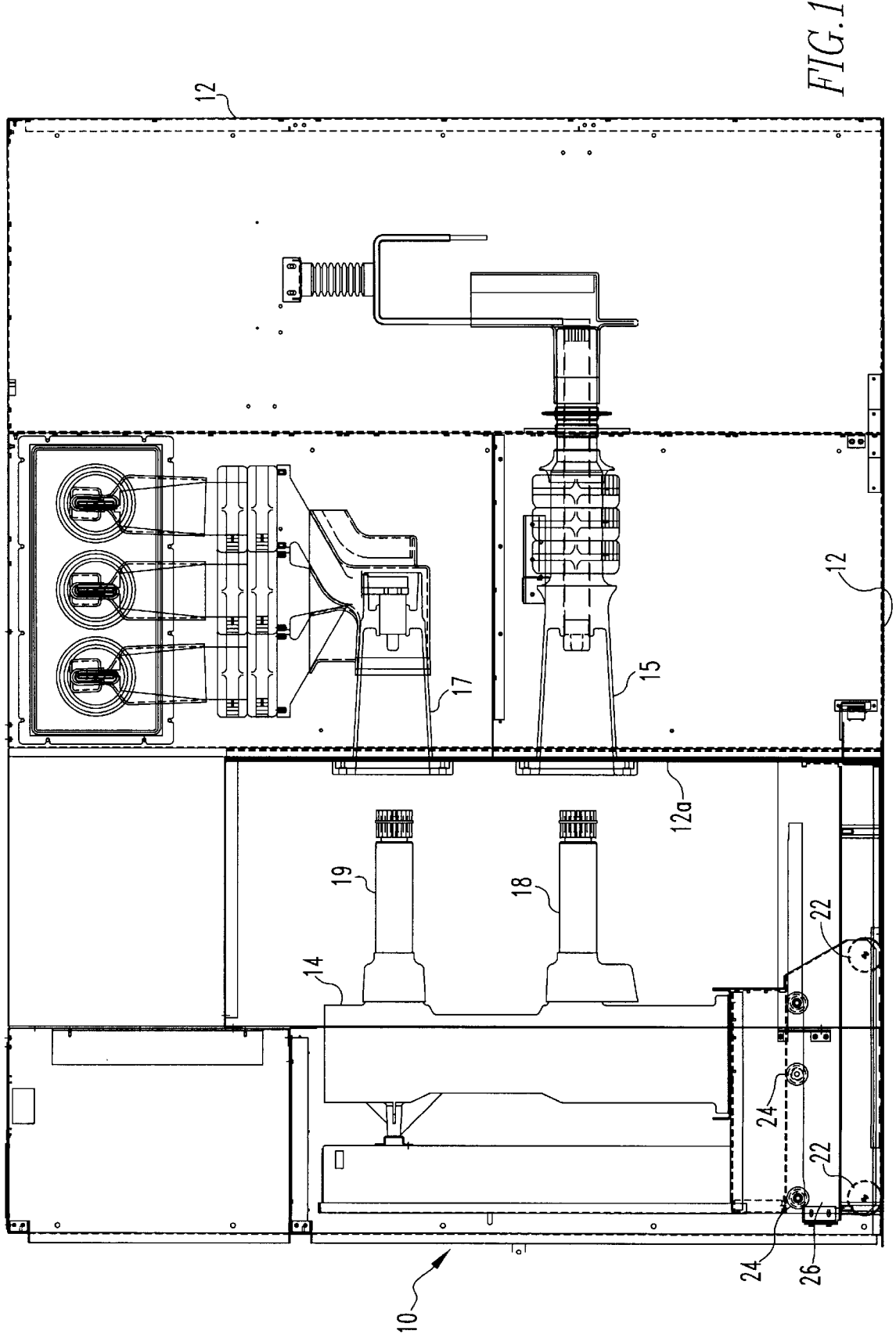
FIG. 1 is a side elevation view showing the inside of a medium voltage switchgear power assembly that is suitable for receiving the invention, and showing a circuit breaker in the switchgear in the disconnect position.
Figure 2:
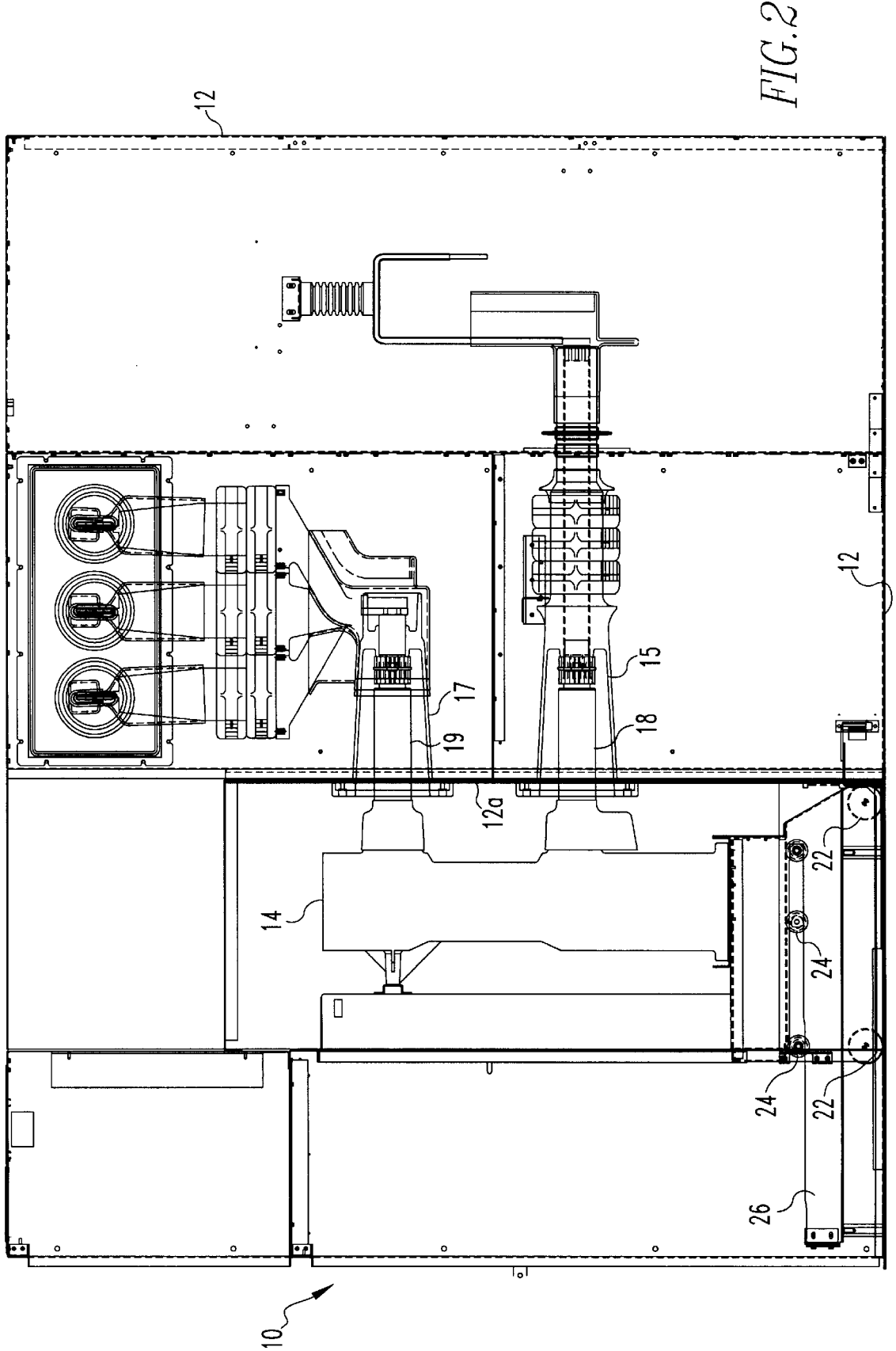
FIG. 2 is a side elevation view similar to FIG. 1, with the circuit breaker in the connect position.

FIGS. 1 and 2 illustrates medium voltage switchgear assembly 10 adapted to have this invention incorporated into it. The switchgear assembly selected for illustration has a design capacity of 38 KV, but the invention can be used with assemblies having a range of power capacities. The switchgear assembly 10 includes a metal cabinet 12 having at least one compartment for housing a draw-out circuit breaker 14 or a dummy element 16 (FIG. 4) and other auxiliary equipment such as doors, buses, cable compartments, instruments, relays and associating wiring as is well known in the art. The back wall 12a of the cabinet 12 has primary contacts or bus stabs 15, 17 on it to connect circuit breakers or dummy elements to the buses of an electrical supply system and the load buses. The cabinet 12 also includes a levering-in pan assembly 20 (FIG. 6) for levering a circuit breaker 14 or a dummy element 16 into and out of engagement with the stabs 15, 17 on the back wall of the cabinet. The levering-in pan assembly 20 includes unique means for preventing engagement or disengagement of a dummy element with the stabs when a circuit breaker in an associated switchgear assembly is engaged in a connect position.

The circuit breaker 14 and the dummy element 16 preferably have wheels 22 for rolling the breaker on the floor and rollers 24 for rolling on rails 26 in the cabinet 12 so the circuit breaker or a dummy element can be moved between their connect and disconnect positions in the switchgear.

FIGS. 1 and 2 shows the circuit breaker 14 positioned in the cabinet 12. A typical dummy element which may be positioned in the cabinet, looks identical to the circuit breaker 14 from the side. The difference is that a dummy element includes copper rods instead of vacuum interrupters.

Figure 3:
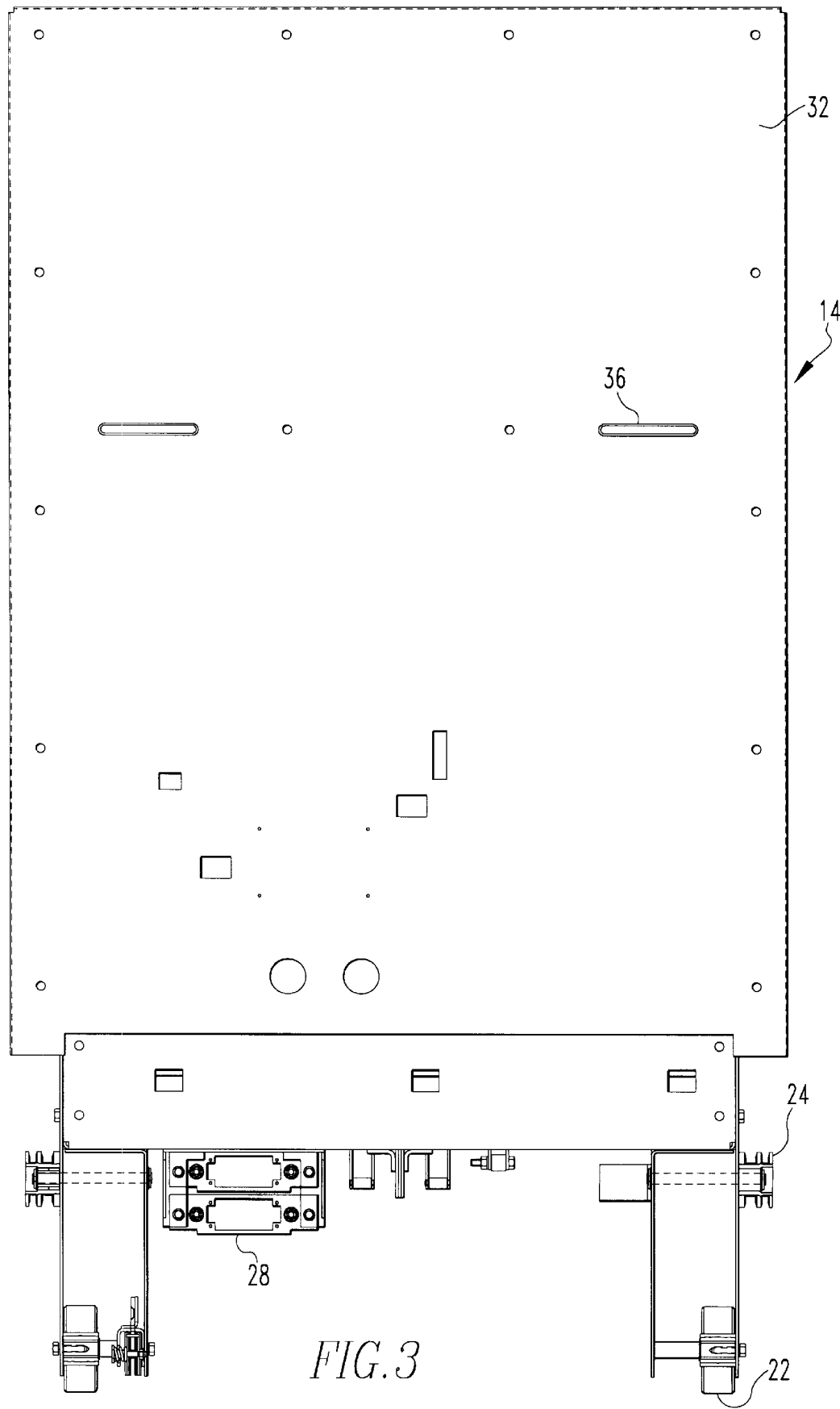
FIG. 3 is a front end view of a vacuum circuit breaker from the switchgear assembly of FIGS. 1 and 2.
Figure 4:
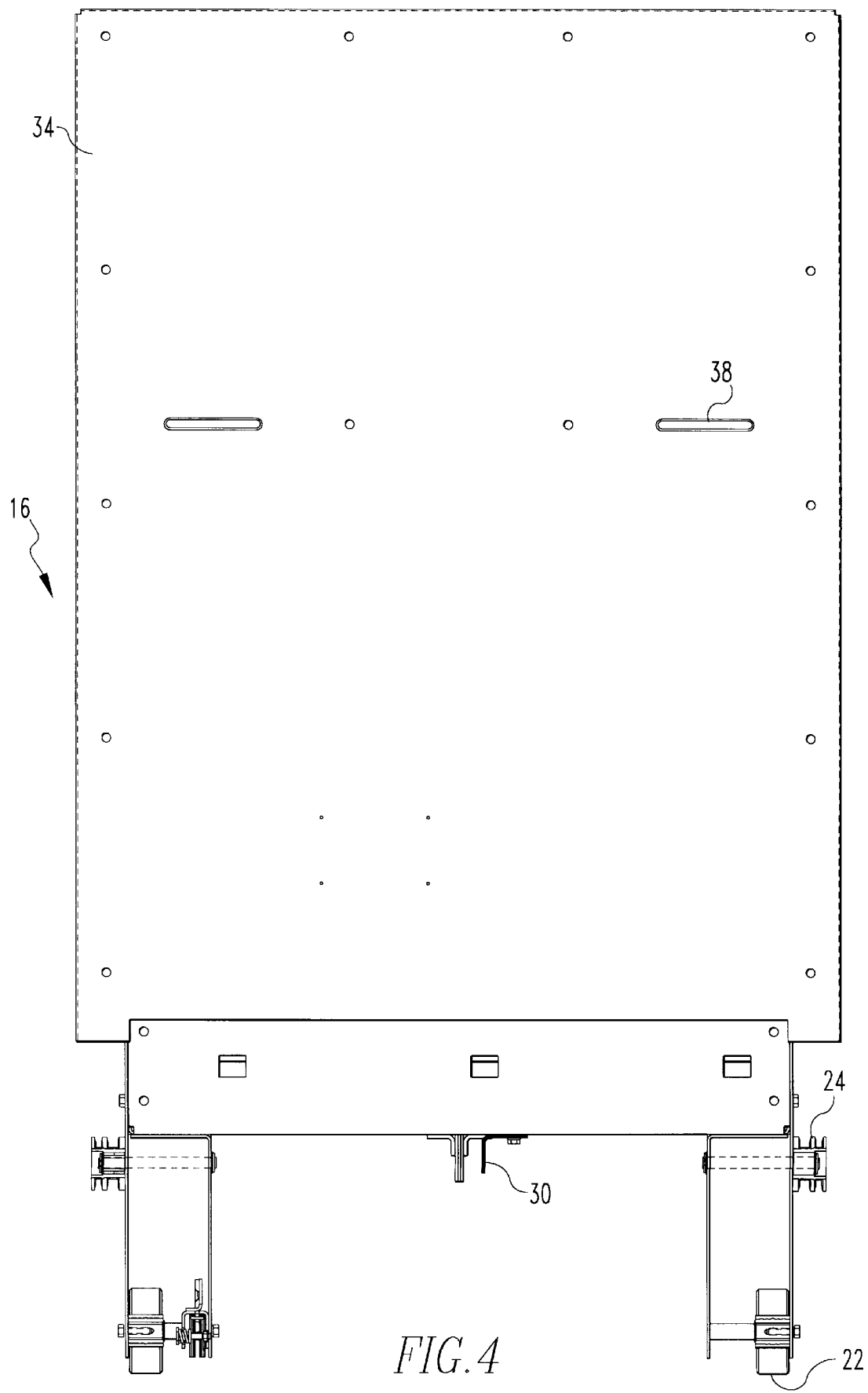
FIG. 4 is a front elevation view of a typical dummy element that may be used in place of a circuit breaker in switchgear of this invention.

FIGS. 3 and 4 are front elevation views of a vacuum circuit breaker 14 (FIG. 3) and a dummy element 16 (FIG. 4) which are very similar except that the circuit breaker has a secondary contact assembly 28, and the dummy element has a downwardly extending finger 30 for operating a positional interlock as is described below. Both of the circuit breaker 14 and the dummy element 16 have front panels, 32 and 34, respectively, with handles 36, 38 on them for gripping to position the breaker 14 and dummy element 16 with respect to a switchgear cabinet 12. FIGS. 3 and 4 also show the wheels 24 and the rollers 22 for rolling the circuit breaker 14 and dummy element into and out of the switchgear assembly.

Figure 5:
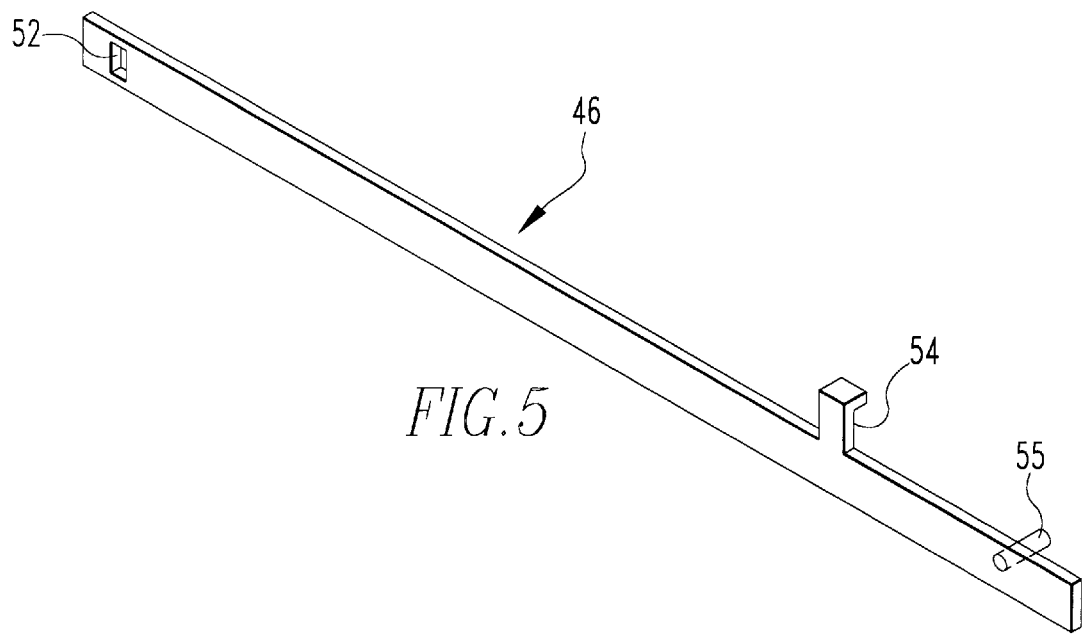
FIG. 5 is a perspective view of a positional interlock bar of this invention.
Figure 6:
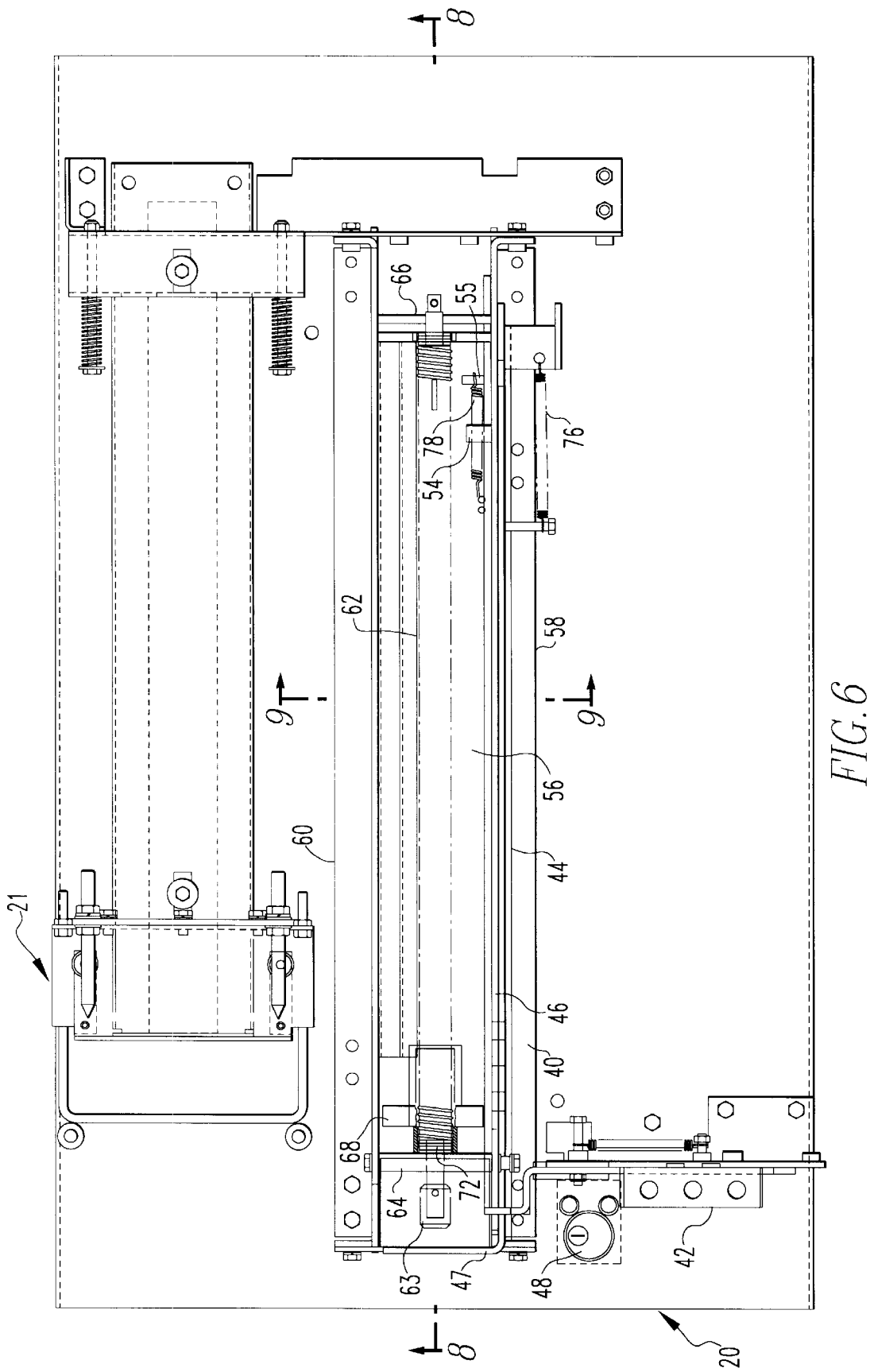
FIG. 6 is a top plan view of a levering pan assembly in switchgear of this invention that includes the positional interlock bar of FIG. 5.

FIG. 6 shows a levering-in pan assembly 20 of this invention. The assembly 20 is mounted in the bottom of the switchgear cabinet 12 for levering a circuit breaker 14 or a dummy element 16 into and out of engagement with the stabs 18, 19. The pan assembly 20 includes a levering-in assembly 40, a padlock slider assembly 42, a cage slider assembly 44, a positional interlock bar 46 (FIG. 5) and a key lock assembly 48.

In accordance with this invention, the unique positional interlock bar 46 (FIG. 5) helps ensure against anyone defeating the safety interlock system. The interlock bar 46 is preferably made of steel or other rigid material and has a slot or hole 52 near one end and an L-shaped finger 54 on it for engagement by the operating finger 30 on the dummy element 16 to slide the interlock bar to the rear as is described below. It also has a pin 55 on it for attachment of a spring 78 (FIG. 6) and for engagement by a levering-in block 68 in the levering-in assembly as is described below.

FIG. 6 shows the levering-in assembly 40 secured to levering pan assembly 20 by a base 56 and left hand (LH) and right hand (RH) L-shaped rail assemblies 58, 60 and includes a drive screw 62 extending between front and rear bearing blocks 64, 66 secured between the rail assemblies. A levering-in block 68 is thread mounted on the drive screw 62 and a front stop 72 is positioned on the drive screw between the levering-in block 68 and the bearing block 64.

Figure 13:
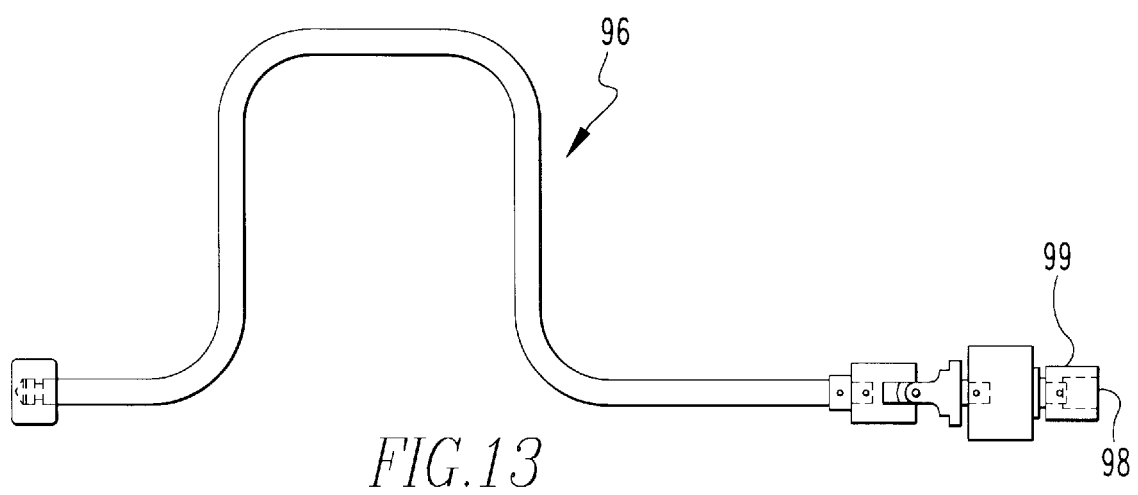
FIG. 13 is a side view of a levering-in crank that can be used with this invention.

The levering-in block 68 moves between the opposite ends of the drive screw when the screw is rotated as by the crank 96 shown in FIG. 13. The levering-in block 68 acts on a circuit breaker or dummy element to lever them between the connect and disconnect positions in the switchgear. The drive screw 62 has a hex drive 63 on its front end (toward the front of the switchgear). The hex drive preferably has hexagonal exterior configuration that fits into a hexagonal socket 98 in the end 99 of the crank 96 shown in FIG. 13.

The RH rail assembly 58 on the right-hand side of the levering-in assembly 20 further has a cage slider assembly 44 next to it, which limits access to the hex driver 63. The cage slider 44 is biased toward the front of the levering-in assembly by a spring 76 and has a front face portion 47 with an access hole 74 through it (FIGS. 8 and 10–12) that is slightly larger than the hex driver 63, but not large enough for the end 99 on crank 96 to pass through. In order to engage the socket 98 of handle 96 on the hex drive 63 and turn the screw 62 to operate the levering-in device, the cage slider 44 must be pushed rearwardly in the levering-in assembly 40 until the hex driver 63 extends at least part way through the hole 74.

As shown in FIG. 7, the levering-in device 40 may also include a rotatable flag 86 having a vertical leg 88, which is preferably colored red. The flag 86 is rotated by breaker position rod 90 that rotates the flag about a pivot 92. The rear end of the rod 90 is connected to the side of the levering-in mechanism so the rod will move with the levering-in mechanism when that mechanism is moved as is explained below. The red flag 86 is visible from the front of the levering-in assembly when the circuit breaker 14 is in the connect position.

The positional interlock bar 46 is mounted in the levering-in device 40 against the inside face of the right-hand rail 58 of the levering-in frame as best seen in FIGS. 6 and 9. The interlock bar 46 is biased toward the front end of the levering-in assembly 40 by a spring 78 and is movable by the levering-in block 68 acting on pin 55 and also by the finger 30 on the dummy element 16 (FIG. 4) acting on finger 54 on the bar to push the bar toward the rear of the levering-in assembly 40, as is explained below.

Figure 10:
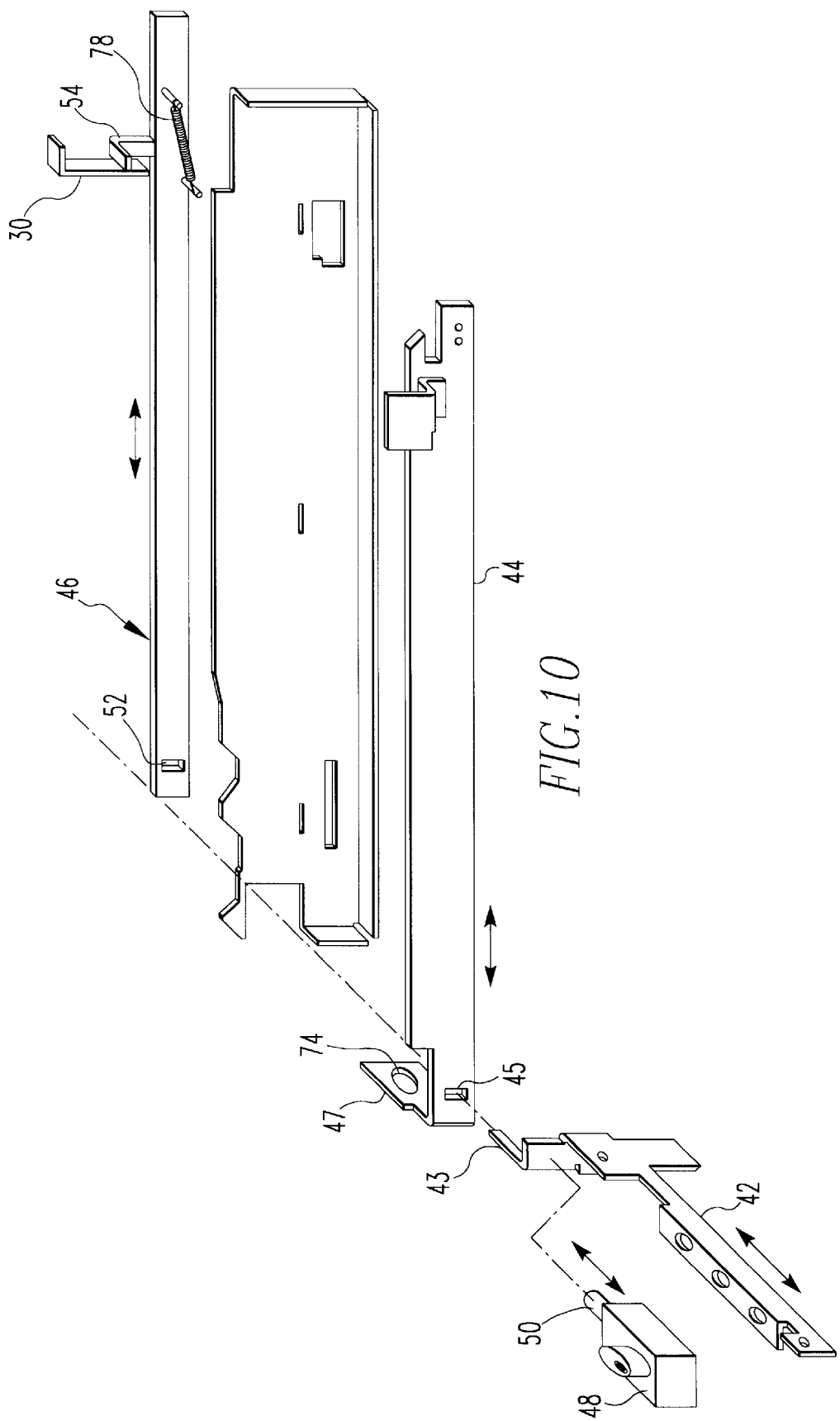
FIG. 10 is an exploded view of a positional interlock bar of this invention showing the position of the bar relative to slider assembly and padlock slider when a dummy element is in the connect position and the key interlock is lockable.
Figure 11:
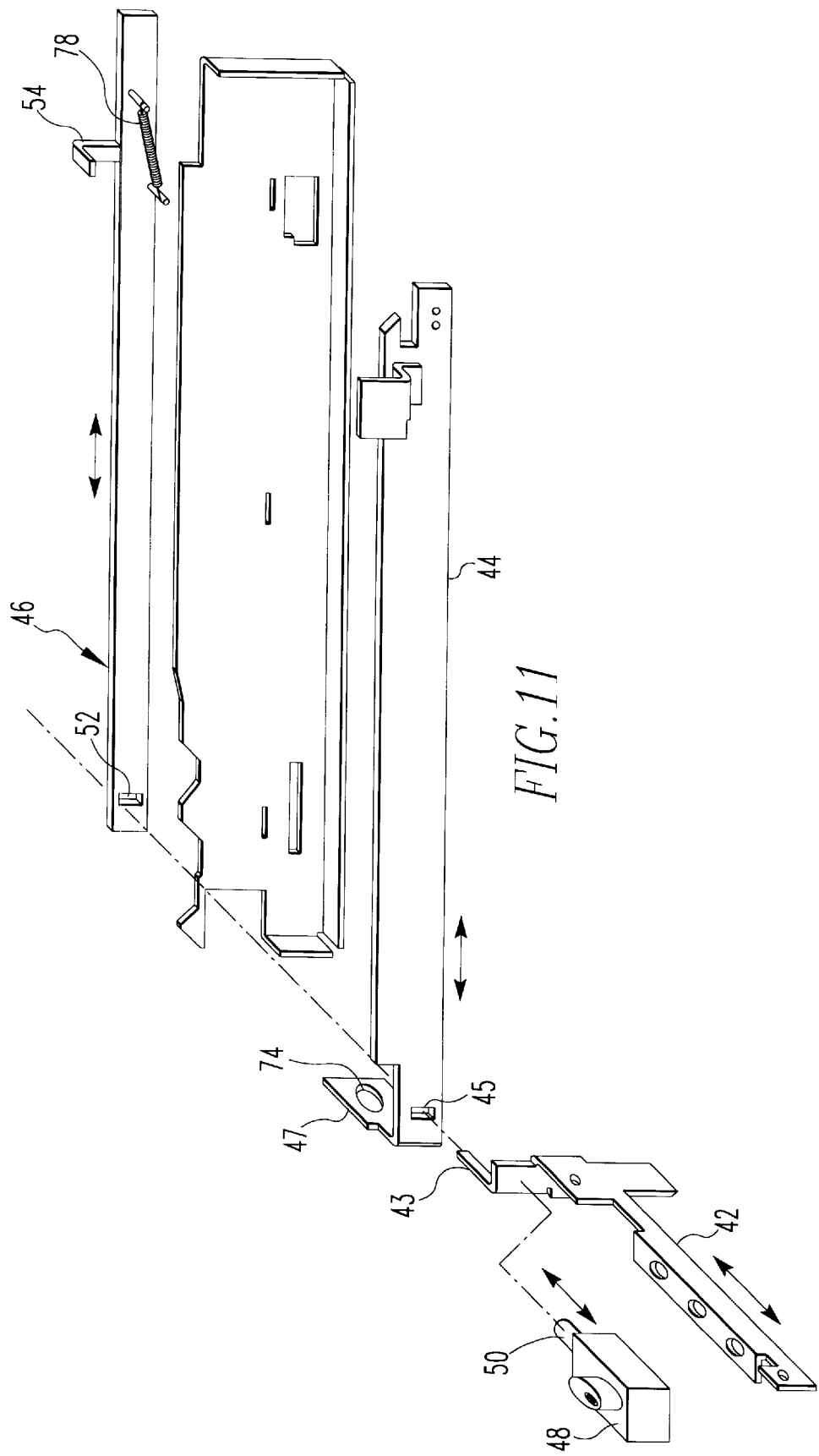
FIG. 11 is an exploded view similar to FIG. 10, except it shows the position of the positional interlock bar when a breaker is in the connect position and the key interlock is not lockable.
Figure 12:
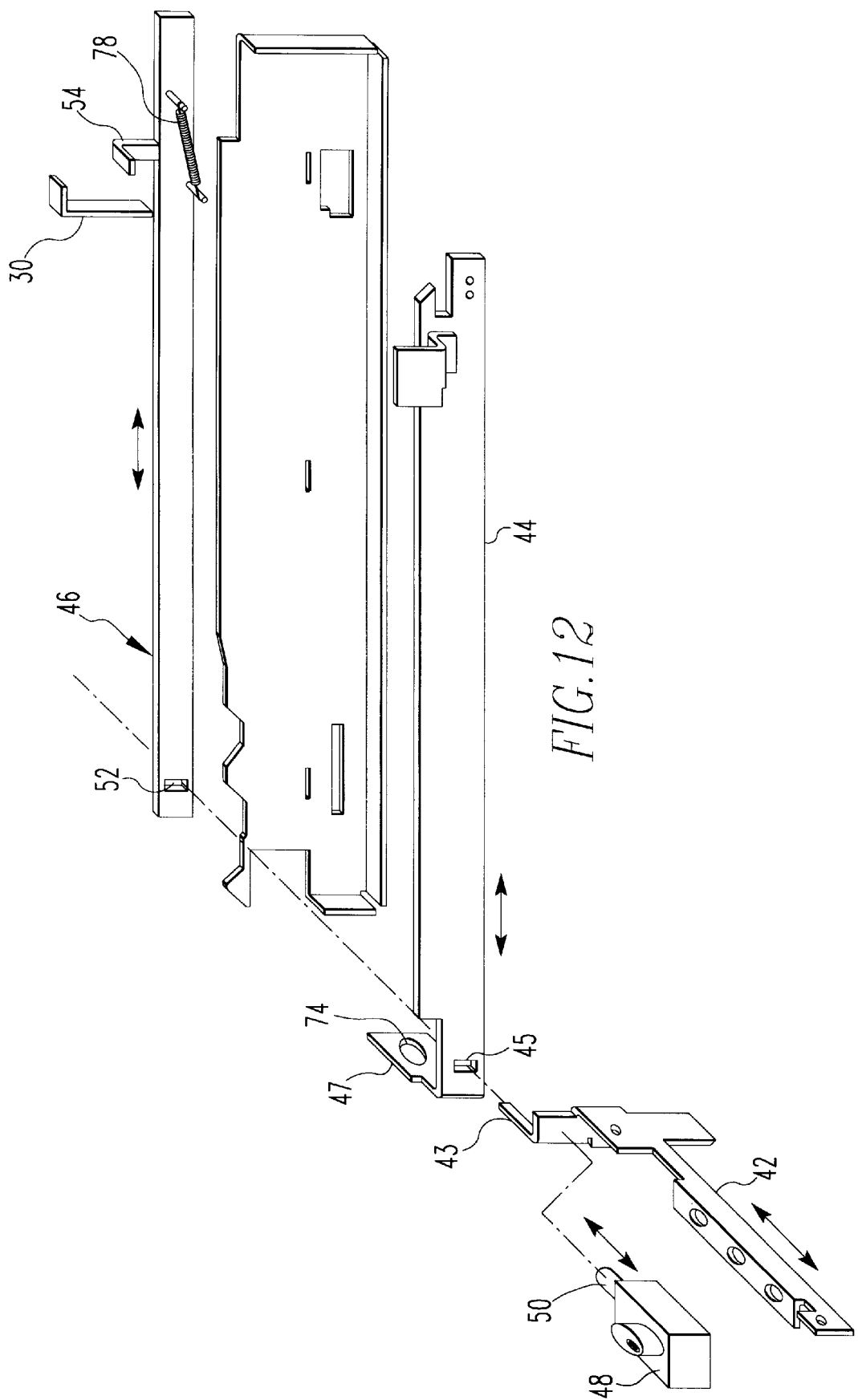
FIG. 12 is an exploded view similar to FIGS. 10 and 11, except it shows the position of the interlock bar when either a breaker or a dummy element is in the test position and the key interlock is lockable.

FIGS. 10, 11 and 12 show the interaction and functioning of the positional interlock bar 46 of this invention with the levering-in block 68, cage slider assembly 44, key interlock 48 padlock slider 42. FIG. 10 shows the position of the interlock bar 46 when a dummy element 16 (FIG. 4) is in the switchgear in the connect position, and the key interlock is "lockable". FIG. 11 shows the position of the interlock bar 46 when a circuit breaker 14 (FIGS. 1–3) is in the switchgear in the connect position, and the key interlock is not "lockable". FIG. 12 shows the position of the interlock bar 46 when either a circuit breaker 14 or a dummy element is in the switchgear in the test position, and the key interlock is "lockable". For purposes of illustration only, the spring 78 is shown on the right hand side of bar 46 in FIGS. 10–12, instead of on the left hand side of the bar as it is in the preferred embodiment (see FIG. 6).

As used herein, the term "lockable" means that a key, not shown, in the key interlock 48 can be turned to operate the key interlock and move the pin 50 to its extended position which pushes the padlock slider 44 through the hole 45 in the slider assembly 44 and through the slot or hole 52 in the interlock bar 46. This locks the slider assembly 44 so it cannot be moved rearwardly in the levering-in assembly 40. Thus, the switchgear is locked in this "safe" position. The key can then be removed from the key interlock 48 of the locked switchgear and used to unlock a key interlock on another switchgear assembly which is in the same electrical power line with the locked switchgear.

The key interlock is lockable when a dummy element in the switchgear is in the connect position as depicted in FIG. 10 or when circuit breaker or dummy element in the switchgear is in the test position as depicted by FIG. 12. When the switchgear is locked in those cases, the key can be safely removed from the key interlock and be available to unlock another switchgear in the same line.

The key interlock is not lockable when a circuit breaker is in the connect position as is depicted by FIG. 11. This means that the key cannot be removed from the key interlock, so the key is not available to unlock another switchgear assembly in the same line. It would not be safe to unlock such other switchgear because the line is energized and moving a dummy element in the associated switchgear between the connect and test positions could cause arcing or an explosion in the switchgear.

Referring again to FIG. 10, which shows the position of the interlock bar 46 when a dummy element is in the connect position, it is seen that a finger 43 on the padlock slider 42 is in line or lined up with the hole 45 in the slider assembly 44 and beyond the forward end of the interlock bar 46. This is because the operator 30 on the dummy element (FIG. 4) has moved the interlock bar to the rear of the levering-in device. The circuit breaker 14 (FIG. 3) has no such operator or finger on it so levering-in of a circuit breaker does not move the interlock bar 46 as far to the rear of the levering-in device as is shown in FIG. 10. Instead, as shown in FIG. 11, the interlock bar blocks the finger 43 on the padlock slider from moving through the bar and prevents the key interlock from being operated. Thus, the key interlock is not lockable, and the key cannot be removed from the key interlock.

The positional interlock bar 46 is in the position shown in FIG. 11 as a result of the levering-in block 68 having engaged the pin 55 on the bar 46 and moved the bar toward the rear of the levering-in assembly as a circuit breaker is levered to the connect position. Due to the particular location of the pin 55 on bar 46 and the extent of travel of the levering-in block 68, the bar 46 moves rearward in the assembly to a position blocking the finger 43 on the padlock slider 42, and no further. Rearward movement of the interlock bar 46 by the levering-in block 68 also occurs when a dummy element is levered to the connect position. However, as explained above, the dummy element has a finger or operator 30 on it that moves the bar 46 further rearward to the position shown in FIG. 10 in which bar 46 does not block the travel of the finger 43 on the padlock slider 42. The current breaker has no such operator to cause such further rearward movement of the interlock bar.

FIG. 12 shows the position of the interlock bar 46 when either a circuit breaker or dummy element in the switchgear is in the test position, and the key interlock is lockable. The spring 78 (FIG. 6) holds the interlock bar 46 in this position. As stated above, the test position is between the fully engaged position with both primary and secondary contacts are engaged and the fully disengaged or withdrawn position in which neither the primary or secondary contacts are engaged. In the test position of a circuit breaker, the secondary contacts are engaged for testing purposes, but the primary contacts are not engaged.

As shown in FIG. 12, the finger 43 on the padlock slider 42 lines up with the hole 45 in the slider 44 and the slot 52 in the interlock bar 46 when a circuit breaker or dummy element is in test position. The key interlock is therefore lockable so the key can be removed from it to operate the key interlock in another switchgear in the same line. This is safe because a dummy element in the line cannot be levered between connect and disconnect positions unless the circuit breaker is locked in the test position or withdrawn position.

It is therefore seen that this invention provides a switchgear assembly having a unique positional interlock bar that greatly reduces or eliminates possible defeating of the safety interlock in the switchgear.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. Electrical switchgear comprising:
    a switchgear enclosure having a back wall with bus stabs for connection with a circuit breaker or a dummy element;
    a levering-in assembly having a levering-in block for moving a circuit breaker or a dummy element between connect, test and disconnect positions in the switchgear enclosure;
    said levering-in assembly including a drive screw having a drive end for engagement by a crank, a cage slider assembly that controls access to said drive end of the drive screw, a key interlock, and a padlock slider for interlocking with said cage slider assembly; and
    said levering-in assembly further having a positional interlock bar inside said levering-in assembly, said positional interlock bar having a finger on it for engagement by an operator on a dummy element, a pin for engagement by said levering-in block, and a hole through said interlock bar, said interlock bar being spring biased to a position blocking said padlock slider, and said interlock bar being movable by said levering-in block acting on said pin on said interlock bar to move the interlock bar to a position blocking said padlock slider when a circuit breaker is in the connect position, and movable by a dummy element to a connect position that permits operation of said padlock slider and locking of said key interlock.

2. Electrical switchgear as set forth in claim 1 which is in an electrical circuit having another similar switchgear, and one said switchgear has a circuit breaker in it and the other switchgear has a dummy element in it.

3. Electrical switchgear as set forth in claim 1 in which said levering-in assembly includes a pair of mounting rails for securing said levering in assembly in said switchgear and with said drive screw and positional interlock bar disposed between said rails.

4. An electrical switchgear having a levering-in device for moving a circuit breaker or a dummy element between connect, test and disconnect positions including a drive screw with a drive end for engagement by a crank, a cage slider assembly that limits access to said drive end of the drive screw, a key interlock and a padlock slider for interlocking with said cage slider assembly, the improvement comprising a positional interlock bar in said levering-in device, said interlock bar blocking said padlock slider from interlocking with said cage slider assembly when a circuit breaker is in the connect position in the switchgear enclosure.

5. An electrical switchgear as set forth in claim 4 in which said positional interlock bar has a finger for engagement with an operator on a dummy element to move the interlock bar to the rear in said levering-in device when a dummy element is moved to the connect position in the switchgear.

6. An electrical switchgear as set forth in claim 5 in which said positional interlock bar has a slot for receiving a finger on said padlock slider when said interlock bar is moved to the rear in the levering-in device by a dummy element.

7. An electrical switchgear as set forth in claim 6 in which includes a spring that biases said positional interlock bar toward the front end of said levering-in device.

8. A positional interlock bar for a levering-in device in electrical switchgear, said interlock bar comprising an elongated metal plate for mounting in a levering-in device adjacent a side rail in the device, said interlock bar having a pin for engagement and movement by a levering-in block in said levering-in device, an upwardly extending finger on said interlock bar for engagement by an operator on a dummy element and having a slot in one end of said interlock bar for receiving a finger on a padlock slider for locking said levering-in device.

9. A positional interlock bar as set forth in claim 8 in which said pin provides means for connecting the interlock bar to a spring to bias the interlock bar toward the front of a levering-in device.

10. A positional interlock bar as set forth in claim 8 that is made from steel flat bar stock.

* * * * *